(12) United States Patent
Whitley

(10) Patent No.: US 6,364,338 B1
(45) Date of Patent: Apr. 2, 2002

(54) SYSTEM FOR TOWING SMALL FOUR WHEELED VEHICLES

(76) Inventor: William P. Whitley, 1993 SE. 6th Ave., Vero Beach, FL (US) 32960

( * ) Notice: Subject to any disclaimer, the term of this patent is extended or adjusted under 35 U.S.C. 154(b) by 0 days.

(21) Appl. No.: 09/640,517

(22) Filed: Aug. 17, 2000

(51) Int. Cl.⁷ .................................................. B60D 1/24
(52) U.S. Cl. ........................ 280/493; 280/495; 280/498
(58) Field of Search ............................. 280/400, 411.1, 280/402, 495, 498, 492, 493, 500, 503, 504; 403/119, 164

(56) References Cited

U.S. PATENT DOCUMENTS

| | | | | |
|---|---|---|---|---|
| 4,123,082 A | * | 10/1978 | Conner | 280/467 |
| 5,186,483 A | * | 2/1993 | Sheppard | 280/494 |
| 5,647,604 A | * | 7/1997 | Russell | 280/492 |
| 6,062,582 A | * | 5/2000 | Martin | 280/493 |

* cited by examiner

*Primary Examiner*—Anne Marie Boehler
*Assistant Examiner*—Tony Winner
(74) *Attorney, Agent, or Firm*—Carroll F. Palmer

(57) ABSTRACT

A tow system is disclosed for towing small four-wheel vehicles having handlebars for steering and equipped with a front luggage bar assembly, e.g. an ATV, behind a van or other tractor vehicle. Such tow system includes a tow bar portion that connects to the front luggage bar assembly, a hitch portion that is fixed to the central rear end portion of the tractor vehicle and spring members connected to the left and right handlebars elastically biasing the four wheel vehicle to move straight ahead. The tow bar portion includes an elongated flat metal bar with a lateral bent end and an angle member is adjustably fastened to the metal bar to provide a reception space to hook onto the front luggage bar assembly of the towed four-wheel vehicle. A mounting plate in the hitch portion is fastened the tow bar portion to allow horizontal movement between the flat metal bar and the mounting plate to accommodate turning of the tractor vehicle.

4 Claims, 2 Drawing Sheets

SYSTEM FOR TOWING SMALL FOUR WHEELED VEHICLES

BACKGROUND OF THE INVENTION

1. Field of the Invention

This application relates broadly to vehicle towing systems. More particularly, it concerns tow systems for towing small, handlebar steered, four wheel vehicles, e.g., All-Terrain vehicles, behind a tractor vehicle, e.g., an automobile, van, truck, 4-wheel drive, or the like.

2. Description of the Prior Art

All-Terrain vehicles (ATVs) have become ubiquitous for a wide variety of uses, e.g., cattle herding, acreage maintenance, transport over mountainous terrain, competitive racing, stunt riding, traveling on sandy beaches, etc. However, ATVs are not suitable, nor usually licensed, for travel on major highways or other paved public roads, but they are frequently garaged or stored at locations quite distance for their point of use. Because of this and for other reasons, often they must be transported over long distances. This has typically been done by carrying them on a pick-up truck or towing them upon custom-built trailers.

It is known to tow motorcycles, either singly or multiply, behind a towing vehicle using hitches that maintain the motorcycle(s) upright (see U.S. Pat. No. 3,713,672). However, these prior art hitches are not suitable for towing four wheel ATVs.

It is also known to tow a pair of ATVs behind a tractor vehicle (see U.S. Pat. No. 5,259,639).

The present invention provides a unique, simple system for safe towing a single ATV or like vehicle behind a tractor vehicle.

OBJECTS

A principal object of the invention is the provision of a system by which a small, handlebar steered, four wheel vehicle, e.g., All-Terrain Vehicles, may be towed behind a tractor vehicle, e.g., an automobile, van, truck, 4-wheel drive, or the like.

A further object is the provision of a unique, simple system for safe towing an ATV or like vehicle behind a tractor vehicle.

Other objects and further scope of applicability of the present invention will become apparent from the detailed descriptions given herein; it should be understood, however, that the detailed descriptions, while indicating preferred embodiments of the invention, are given by way of illustration only, since various changes and modifications within the spirit and scope of the invention will become apparent from such descriptions.

SUMMARY OF THE INVENTION

The objects are accomplished in accordance with the invention by the provision of a system for towing small four-wheel vehicles having left and right handlebars for steering and equipped with a front luggage bar assembly, behind a tractor vehicle that comprises (a) tow bar means that connects to the front luggage bar assembly, (b) hitch means that is fixed to the central rear end portion of the tractor vehicle and (c) spring means connected to each of the left and right handlebars elastically biasing them into the position that causes the four wheel vehicle to move straight ahead. Advantageously, the spring means consists of a section of elastic cord having a hook element fastened to each end thereof, one of the hook elements being fixed to one of the handlebars and the other of the hook elements being fixed to another part of the four wheel vehicle.

The tow bar means comprises an elongated flat metal bar defined by a front end, a rear end and a pair of parallel sides. The front end contains a first bore centered therein between the parallel sides and the rear end being bent into a lateral projection that contains a second bore centered between the parallel sides.

The tow bar means also has an angle member defined by a mounting web containing a first pair of spaced apart bores and a lateral web containing a third bore centered therein. A second pair of spaced apart bores extend through the flat metal bar near the rear end thereof and a pair of bolts that extend through the first and second spaced apart bores adjustably fix the angle member to the flat metal bar providing a reception space between the lateral projection and the lateral web. A fastener extends through the second and third bores to secure the reception space. Advantageously, the fastener means is a quick release pin or a pin and cotter combination The hitch means includes a mounting plate a rear portion that contains a fourth bore and a front portion securely connected to the central rear end portion of the tractor vehicle. Fastener means extends through the first bore and the fourth bore to connect the tow bar means to the hitch means while allowing horizontal movement between the flat metal bar and the mounting plate.

BRIEF DESCRIPTION OF THE DRAWINGS

A more complete understanding of the invention can be obtained by reference to the accompanying drawings in which.

DESCRIPTION OF THE PREFERRED EMBODIMENTS

Figure 1:
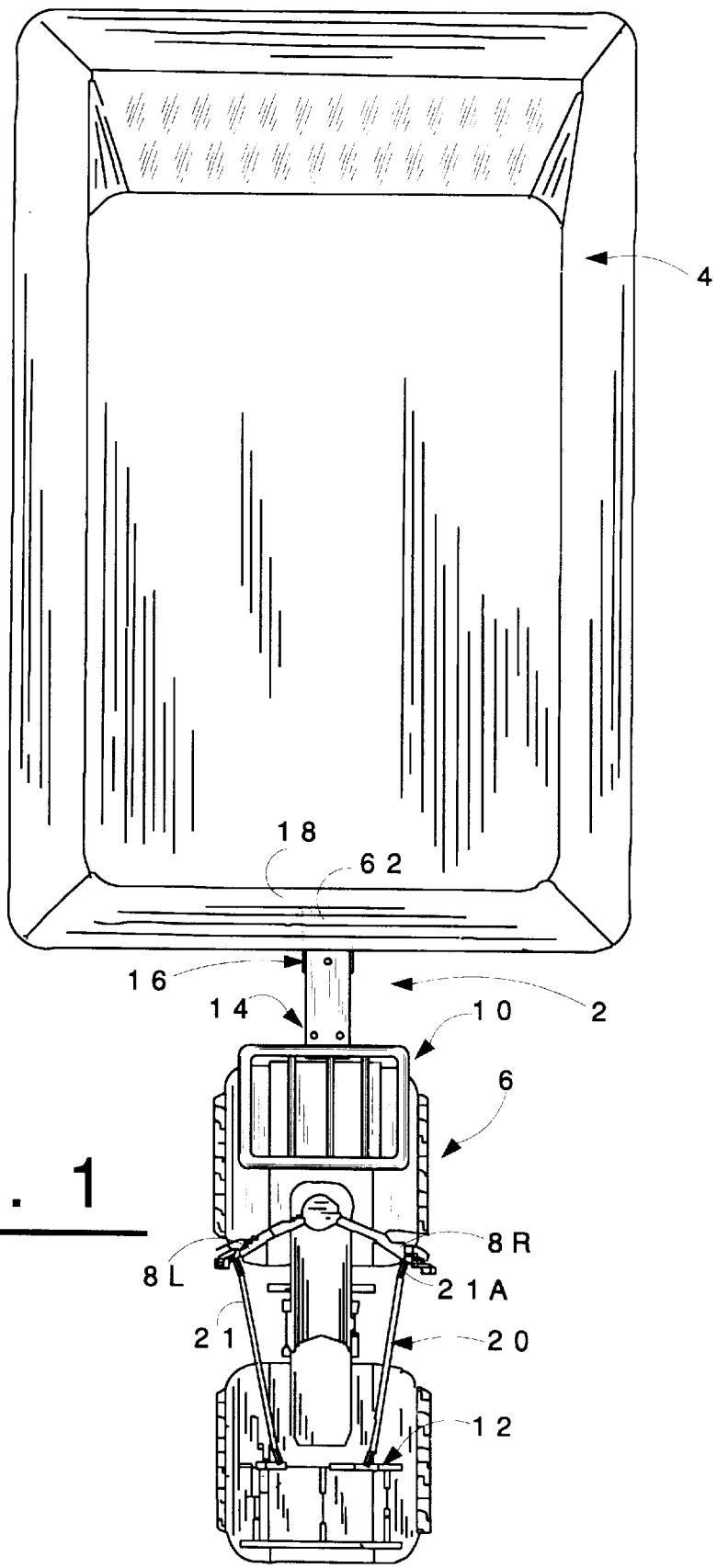
FIG. 1 is a plan view of an all-terrain vehicle being towed by a van using the towing system of the invention.

Referring in detail to the drawings, the invention provides a tow system 2 of for towing behind van 4 an all-terrain vehicle 6. Vehicle 6 has left handlebar 8L and right handlebar 8R for steering and also includes a front luggage bar assembly 10 and rear luggage rack 12.

The tow system 2 comprises tow bar means 14 that connects to the front luggage bar assembly 10, hitch means 16 that is fixed to the central rear end portion 18 of the van 4 and spring means 20 connected to each the left and right handlebars 8L & 8R elastically biasing them into the position that urges the all-terrain vehicle 6 to move straight ahead. Spring means 20 advantageously consists of a section of elastic cord 21 cord having a hook element 21A fastened to each end thereof, one of the hook elements being fixed to one of the handlebars and the other hook element being fixed to another part of the four wheel vehicle.

The tow bar means 14 comprises elongated flat metal bar 22 defined by a front end 24, a rear end 26 and a pair of parallel sides 28 & 30. The front end 24 contains a first bore 32 centered therein between parallel sides 28 & 30. The rear end is bent into a lateral projection 32 that contains a second bore 34 between centered parallel sides 28 & 30.

An angle member 36 is defined by a mounting web 38 that contains a first pair of spaced apart bores 39 and a lateral web 40 containing a third bore 42 centered therein.

A second pair of spaced apart bores 44 extend through bar 22 near its rear end 26 and a pair of bolts 46 extend through spaced apart bores 39 & 44 to adjustably fix angle member 36 to flat metal bar 22 providing a reception space 48 between lateral projection 32 and lateral web 40.

Figure 2:
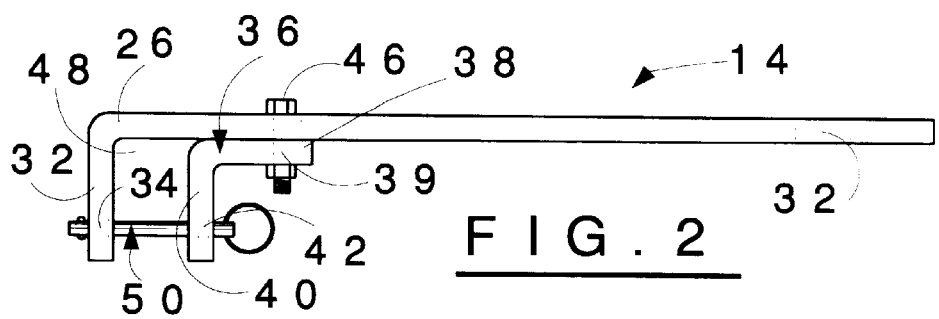
FIG. 2 is a lateral view of the hitch means components of the towing system of the invention.
Figure 3:
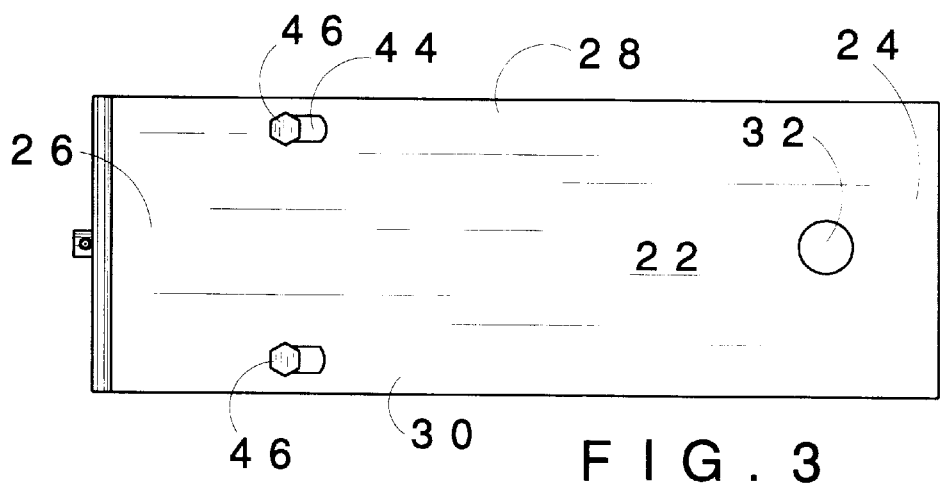
FIG. 3 is a plan view of the hitch means components of the new towing system.
Figure 4:
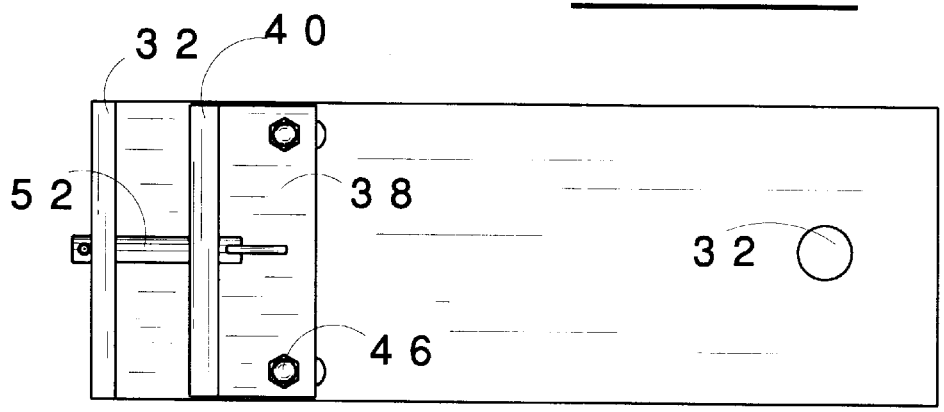
FIG. 4 is an adverse view of the hitch means components of the new towing system.
Figure 5:
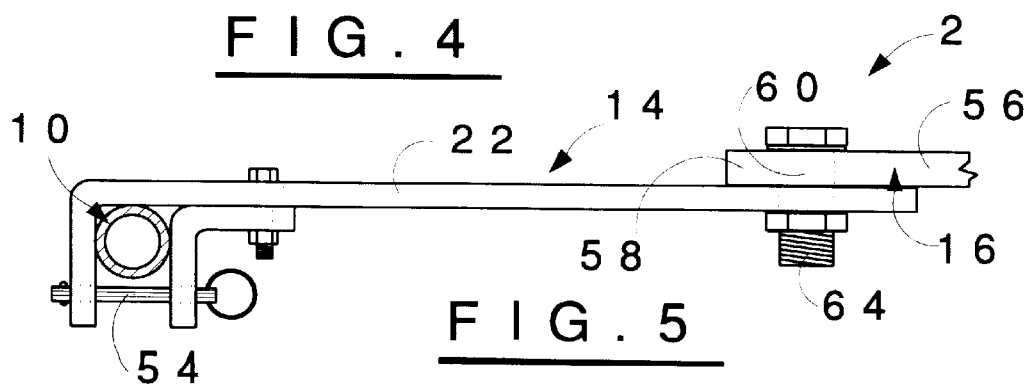
FIG. 5 is a fragmentary sectional view of an all-terrain vehicle towing system of the invention.

A fastener 50 extends through second and third bores 34 & 42 respectively to secure the reception space 48. In FIGS. 2 & 4, the fastener means 50 is a quick release pin 52 and in FIG. 5 it is a pin and cotter 54.

The hitch means 16 comprises a mounting plate 56 defined by a rear portion 58 containing a fourth bore 60 and a front portion 62 securely connected to the central rear end portion 18 of van 4.

A bolt 64 extends through bores 32 and 60 to connect tow bar means 14 to hitch means 16 while allowing horizontal movement between flat metal bar 22 and mounting plate 56.

What is claimed is:

1. A tow system for towing small four-wheel vehicles, having left and right handlebars for steering and equipped with a front luggage bar assembly, behind a tractor vehicle that comprises:

tow bar means that connects to the front luggage bar assembly, hitch means that is fixed to the central rear end portion of the tractor vehicle and spring means connected to each the left and right handlebars elastically biasing them into the position that causes the four wheel vehicle to move straight ahead, the tow bar means comprising:

an elongated flat metal bar defined by a front end, a rear end and a pair of parallel sides, the front end containing a first bore centered therein between the parallel sides and the rear end being bent into a lateral projection that contains a second bore centered between the parallel sides, an angle member defined by a mounting web containing a first pair of spaced apart bores and a lateral web containing a third bore centered therein, a second pair of spaced apart bores through the flat metal bar near the rear end thereof, a pair of bolts that extend through the first and second spaced apart bores to adjustably fix the angle member to the flat metal bar providing a reception space between the lateral projection and the lateral web and a fastener that extends through the second and third bores to secure the reception space the hitch means comprising:

a mounting plate defined by a rear portion containing a fourth bore and a front portion securely connected to the central rear end portion of the tractor vehicle and fastener means extending through the first bore and the fourth bore to connect the tow bar means to the hitch means while allowing horizontal movement between the flat metal bar and the mounting plate.

2. The system of claim 1 wherein the spring means consists of a section of elastic cord having a hook element fastened to each end thereof, one of the hook elements being fixed to one of the handlebars and the other of the hook elements being fixed to another part of the four wheel vehicle.

3. The system of claim 1 wherein each the fastener means is a quick release pin.

4. The system of claim 1 wherein the fastener means is a pin and cotter combination.

* * * * *